United States Patent [19]

Baggett

[11] 4,055,544
[45] Oct. 25, 1977

[54] PROCESS FOR MAKING POLYCARBONATES USING AMMONIA OR AMMONIA COMPOUNDS AS THE CATALYSTS

[75] Inventor: Joseph McClendon Baggett, Freeport, Tex.

[73] Assignee: The Dow Chemical Company, Midland, Mich.

[21] Appl. No.: 704,202

[22] Filed: July 12, 1976

[51] Int. Cl.$^2$ .......................................... C08G 63/62
[52] U.S. Cl. .............................................. 260/47 XA
[58] Field of Search ............ 260/47 XA, 463, 77.5 D, 260/77.5 UA, 49

[56] References Cited

U.S. PATENT DOCUMENTS

| | | | |
|---|---|---|---|
| 3,223,678 | 12/1965 | Bolgiano | 260/47 XA |
| 3,290,409 | 12/1966 | Munro | 260/47 XA |
| 3,312,662 | 4/1967 | Kurkjy et al. | 260/47 XA |

OTHER PUBLICATIONS

Condensed Chem. Dictionary 8th Edit. p. 49, May, 1974.

*Primary Examiner*—Theodore E. Pertilla
*Attorney, Agent, or Firm*—Benjamin G. Colley

[57] ABSTRACT

Thermoplastic polycarbonates are prepared by interfacial polymerization wherein carbonyl halides, dihydric phenols and a catalytic amount of ammonia or an ammonium compound which liberates ammonia during the reaction are reacted.

The polycarbonates thus prepared have chloroformate end groups and are useful as intermediates to be capped with various terminal groups in a know manner.

6 Claims, No Drawings

PROCESS FOR MAKING POLYCARBONATES USING AMMONIA OR AMMONIA COMPOUNDS AS THE CATALYSTS

BACKGROUND OF THE INVENTION

This invention relates to a method of making polycarbonates prepared by the interfacial technique by using ammonia or ammonium compounds as the catalysts.

It is known that in the interfacial polymerization process to make aromatic polycarbonates from dihydric phenols and phosgene the use of small amounts of tertiary amines, quaternary ammonium compounds, arsonium and sulfonium compounds can be used to catalyze the reaction.

SUMMARY OF THE INVENTION

It now has been discovered that thermoplastic aromatic polycarbonates can be made under interfacial polycarbonate forming conditions wherein the following are reacted:

1. a carbonyl halide,
2. a dihydric phenol or mixtures of dihydric phenols, and
3. a catalytic amount of ammonia or an ammonium compound which liberates ammonia under the conditions of the reaction.

More specifically the process of this invention comprises reacting under interfacial polycarbonate-forming conditions 1. a carbonyl halide,
2. a dihydric phenol or mixtures of dihydric phenols, and
3. a catalytic amount of a compound having one of the formulas
   A. $NH_3$
   B. $NH_4Z$ or
   C. $(NH_4)_2Z_1$ wherein Z is a monovalent inorganic anion and $Z_1$ is a divalent inorganic anion.

The process is thus useful to make thermoplastic polycarbonates without the need for the known catalysts. The polycarbonates prepared have a weight average molecular weight range from about 20,000 to about 60,000 as measured by gel permeation chromatography and have reactive chloroformate end groups. The polymers of this invention are thus useful as intermediates to be end capped with known terminal groups as shown in U.S. Pat. Nos. 3,026,298, 3,036,040, 3,080,342, 3,085,992, and 3,133,045.

DETAILED DESCRIPTION

The process of this invention is carried out by first reacting and stirring a dihydric phenol compound or a mixture of dihydric phenols such as bisphenol A with an aqueous caustic solution made from sodium or potassium hydroxide having a pH greater than 9 and preferably in the pH range from 10-12 wherein the aqueous solution contains a catalytic amount of a compound selected from the group consisting of ammonia or an ammonium compound which liberates ammonia under the conditions of the reaction.

For the purposes of this invention, a catalytic quantity is defined as being about 0.5 to about 5.0 weight percent based on the dihydric phenol of ammonia or an ammonium compound. This catalytic quantity is added to the reactants together with 5-10 moles of a halogenated solvent such as methylene chloride.

The catalyzed reactants are stirred and allowed to react for about 0.25 to about 3 hours at a temperature of about 20° to about 40° C.

Suitable catalytic compounds within the scope of this invention are exemplified by ammonia, ammonium hydroxide, ammonium carbonate, ammonium sulfite, ammonium chloride, ammonium phosphate, ammonium sulfate, ammonium nitrate, and the like.

The dihydric phenols employed in the practice of this invention are known dihydric phenols in which the sole reactive groups are the two phenolic hydroxyl groups. Some of these are represented by the general formula

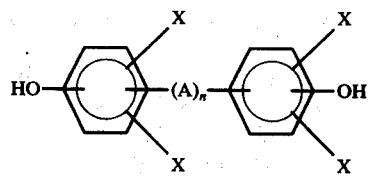

wherein A is a divalent hydrocarbon radical containing 1-15 carbon atoms,

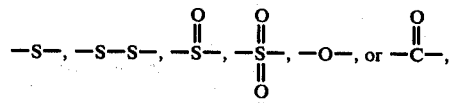

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

One group of suitable dihydric phenols are those illustrated below:

1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)chclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3,-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4-hydroxyphenyl)propane (Bis A)
1,1-bis(3-methyl-4-hydroxyphenyl)ethane
1,1-bis(4-hydroxyphenyl)methane.

Another group of dihydric phenols useful in the practice of the present invention include the dihydroxyl diphenyl sulfoxides such as for example:

bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxaryl sulfones such as, for example:

bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:

3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:

bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

A further group of dihydric phenols outside the scope of the above generic formula which may be used in the practice of the invention includes the dihydroxy benzenes, and the halo- and alkylsubstituted dihydroxy benzenes, such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The recovery of the polycarbonate is accomplished by decanting the aqueous layer, treating the remaining halogenated solvent with a strong aqueous acid solution (pH 1-3) such as hydrochloric or sulfuric acid solution, to neutralize the NaOH or KOH and washing with distilled water.

Finally, the polymer is precipitated from the solvent solution by pouring it into an excess of a non-solvent for the polymer such as hexane, ethanol, petroleum ether, etc. The white precipitated polymer is then filtered, water washed and dried in a vacuum.

EXAMPLES 1-9

Into a 5 liter flask equipped with stirrer, dip tube, thermometer, and reflux condenser were charged with the following: 400 gms p-Bisphenol A, 20 gms $(NH_4)_2SO_3$, and 1475 gms of water. The contents were stirred and nitrogen purged 5 minutes. With continued stirring and nitrogen purging, 217 gms of 35% aqueous NaOH were added. After stirring and purging 5 minutes and cooling to 25° C by external cooling, the phosgenation reaction was started. This involved the feeding of 218 gms of gaseous phosgene over a 99 minute period and controlling the reaction temperature between 25°-30° C. After 76 gms of phosgene had been added, alternating caustic and phosgene addition were made was follows: 98 gms 35% NaOH aqueous solution, 57 gms phosene; 98 gms 35% NaOH solution, 27 gms phosgene; 98 gms 35% NaOH solution, 26 gms phosgene; and 61 gms 35% NaOH solution, 32 gms phosgene. After completion of the phosgenation reaction, the external cooling was removed, and the reactions were stirred and digested 30 minutes at 25° C. The stirrer was stopped, the aqueous phase siphoned off, the viscous organic phase was then acidified with concentrated HCl, diluted with methylene chloride to a desirable viscosity, and then filtered through diatomaceous earth to give a clear solution. The polymer was precipitated in hexane, filtered, and vacuum dried at 120° C.

Following the procedures set forth above, the control and the examples set forth in Table I were prepared.

TABLE I

| Example | Grams Catalyst | Ammonium (Am) Salt Catalyst | Wt. % Catalyst | Wt. Avg. Mol. Wt. (G.P.C.) |
|---|---|---|---|---|
| Control | 0 | none | | no polymerization |
| 1 | 4.2 | (Am sulfite) | 1.05 | 31,900 |
| 2 | 5.8 | (Am sulfite) | 1.45 | 29,000 |
| 3 | 5.8 | (Am sulfite) | 1.45 | 34,000 |
| 4 | 5.8 | (Am sulfite) | 1.45 | 28,000 |
| 5 | 6.4 | (Am sulfite) | 1.6 | 35,580 |
| 6 | 6.9 | (Am sulfite) | 1.72 | 42,940 |
| 7 | 8.5 | (Am sulfite) | 2.12 | 25,300 |
| 8 | 9.6 | (Am sulfite) | 2.400 | 38,600 |
| 9 | 11.7 | (Am sulfite) | 2.92 | 25,381 |

EXAMPLE 10-12

Into a 1 liter flask equipped with stirrer, thermometer, dip tube and reflux condenser are measured 75 gms p-Bisphenol A, 1.1 gms $NH_4Cl$, and 276 ml $H_2O$. The contents are stirred and nitrogen purged for 5 minutes, then 34 ml of 35% NaOH are added with continued $N_2$ purging and stirring for 5 minutes (total NaOH to be used 37.5 gms solid NaOH plus 69.7 gms $H_2O$). At this point 214 ml of methylene chloride was added with stirring. The $N_2$ purge was continued and the contents stirred for 5 minutes. The phosgenation was carried out in stages with incremental additions of caustic as follows: 14 gms of phosgene, 14 ml 35% NaOH; 10 gms phosgene, 14 ml NaOH 35%; 6 gms phosgene, 14 ml 35% NaOH; 5 gms phosgene, 6 ml 35% NaOH; and finally 5.5 gms phosgene. The phosgenation was carried out in 24 minutes at 28°-34° C. After the phosgenation step, the reaction mixture was stirred and digested 30 minutes at 30° C. The water was then siphoned off; the reaction mixture was acidified with HCl; diluted with methylene chloride to desired viscosity and transferred to separatory funnel. After the solution was allowed to separate for 30 minutes into two phases the lower phase was then filtered through a diatomaceous earth filter. The resulting clear solution was precipitated in hexane, and the polymer filtered out. The polymer was then chopped in a Waring blender with H₂O, filtered, and vacuum dried.

Following the above procedures the examples set forth in Table II were prepared.

TABLE II

| Example | Grams Catalyst | Ammonium (Am) Salt Catalyst | Wt. % Catalyst | Wt. Avg. Mol. Wt. (G.P.C.) |
| --- | --- | --- | --- | --- |
| 10 | 1.1 | Am chloride | 1.46 | 23,959 |
| 11 | 1.2 | Am chloride | 1.60 | 27,846 |
| 12 | 1.3 | Am chloride | 1.73 | 24,453 |

EXAMPLE 13

Following the procedures set forth in Examples 10-12 1.36 gms of ammonium hydroxide (28% by weight aqueous solution) was used as the catalyst to produe a bisphenol A polycarbonate having a weight average moelcular weight of 27,613 as determined by gel permation chromatography.

I claim:

1. A process for making thermoplastic aromatic polycarbonates which comprises reacting under interfacial polycarbonate-forming conditions
   1. a carbonyl halide,
   2. a dihydric phenol or mixtures of dihydric phenols, and
   3. a catalytic amount of ammonia or an ammonium compound which liberates ammonia under the conditions of the reaction.

2. The process as set forth in claim 1 wherein the catalytic amount used from about 0.5 to about 5.0 weight percent based on the dihydric phenol.

3. A process for making thermoplastic polycarbonates which comprises reacting under interfacial polycarbonate-forming conditions
   1. a carbonyl halide,
   2. a dihydric phenol or mixtures of dihydric phenols, and
   3. a catalytic amount of a compound having one of the formulas
      A. $NH_3$
      B. $NH_4Z$ or
      C. $(NH_4)_2Z_1$
      wherein Z is a monovalent inorganic anion and Z is a divalent inorganic anion.

4. The process as set forth in claim 3 wherein the catalytic compound has the formula $NH_4Z$ wherein Z is selected from the group consisting of the chloride, hydroxide or nitrate anions.

5. The process as set forth in claim 3 wherein the catalytic compound has the formula $(NH_4)_2Z$ wherein Z is selected from the group consisting of the sulfite, carbonate, sulfate, or hydrogen phosphite anions.

6. The process as set forth in claim 3 wherein the catalytic amount used is from about 0.5 to about 5.0 weight percent based on the dihydric phenol.

* * * * *